United States Patent Office 3,849,465
Patented Nov. 19, 1974

3,849,465
N-CYANOIMINES AND N-CYANOAZIRIDINES
Frank Dennis Marsh, Wilmington, Del., assignor to E. I. du Pont de Nemours and Company, Wilmington, Del.
No Drawing. Application July 16, 1964, Ser. No. 383,233, now Patent No. 3,510,474, which is a continuation-in-part of abandoned application Ser. No. 234,878, Nov. 1, 1962. Divided and this application June 11, 1969, Ser. No. 832,423
Int. Cl. C07c *119/00*
U.S. Cl. 260—453 R          8 Claims

ABSTRACT OF THE DISCLOSURE

Described and claimed are N-cyanoimines, which are hydrolyzable to the corresponding carbonyl compounds and cyanamide, and N-cyanoaziridines. Said N-cyanoimines are useful as adhesives for bonding neoprene as well as intermediates for preparing cyanamide and carbonyl compounds. The compounds are obtained by reacting cyanogen azide with monomeric precursors containing the nonaromatic >C=C< bond.

RELATED APPLICATIONS

This application is a division of my copending application Ser. No. 383,233, now U.S. Pat. 3,510,474, filed July 16, 1964, as a continuation-in-part of my copending application Ser. No. 234,878, filed Nov. 1, 1962, and now abandoned.

BACKGROUND OF THE INVENTION (1) Field of the Invention

This invention relates to new kinds of nitrogen compounds, N-cyanoimines and N-cyanoaziridines.

(2) Description of the Prior Art

Brigl, Berichte, vol. 45, p. 1557 (1912) purports to show an N-cyanoimine in formula II. He rejects it as not representing the compound he prepared from cyanamide and acetoacetic ester.

Goldberg and Golov, Reactions of Cyanamide and Ketones, Khim. Nauka i Prom., *4,* 138 (1959); C.A., vol. 53, col. 16953 (1959) purport to show the preparation of N-cyanoimines by reaction of cyanamide with ketones. The reaction products have an indeterminate structure however and are not the compounds of this invention.

Warning: Cyanogen azide is explosive when free or nearly free of solvent and should then be handled with great care. It can be used, however, with comparative safety in dilute or moderately concentrated solution.

DESCRIPTION OF THE INVENTION

The novel products of this invention are derived from ethylenically unsaturated precursors.

The products obtained by reaction of cyanogen azide with ethylenically unsaturated compounds vary in complexity from comparatively simple compounds obtained by reaction of a single molecule of cyanogen azide with a molecule of a monomeric compound containing a single ethylenic linkage to polysubstituted products obtained by reaction of a number of cyanogen azide molecules with a monomeric molecule containing a plurality of ethylenic linkages. The basic reaction in all instances is the same, however, and results in the formation of products containing one or more of the characteristic groups.

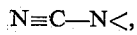

wherein the dangling valences are attached either to two separate adjoining carbons of an organic group thereby forming an N-cyanoaziridine, i.e., a compound containing an N-cyanoazacyclopropyl group, or to a single carbon of an organic group to form an N-cyanoimine. In the reaction of cyanogen azide with a monoethylenic compound, a mixture of N-cyanoaziridine and N-cyanoimine is generally formed, whereas in the addition of cyanogen azide to compounds containing two or more ethylenic groups, the products may contain both N-cyanoaziridine and N-cyanoimine groups in the same molecule. These reaction products, the preparation of which is described more fully in my copending application Ser. No. 383,233, are as follows:

(1) N-cyanoaziridines of the formula

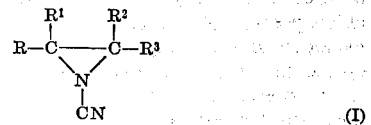

wherein the R's (R, $R^1$, $R^2$ and $R^3$) individually are members of the group consisting of hydrogen, halogen, nitro, hydroxy, cyano, alkoxy, aryloxy, alkylsilyl, alkylthio, acyl, acyloxy, carboxyl, carbamoyl, N-hydrocarbylcarbamoyl, hydrocarbyloxycarbonyl, e.g., alkoxycarbonyl, hydrocarbyl, including alkyl, aryl, aralkyl, alkylaryl, cycloalkyl, and alkenyl, and substituted hydrocarbyl groups containing one or more of the previously mentioned groups as substituents, e.g., haloalkyl, haloaryl, hydroxyalkyl, hydroxyaryl, cyanoalkyl, cyanoaryl, alkoxyalkyl and alkoxyaryl, said R's individually containing up to 18 carbons; and where any two R's may be joined together to form an alkylene or oxygen-interrupted alkylene group of up to 14 carbons. These compounds are obtained by the reaction of cyanogen azide with monomeric ethylenic compounds of the formula $R(R^1)C=(R^2)R^3$ which preferably contains up to a total of 18 carbons; and (2) N-cyanoimines of the formula

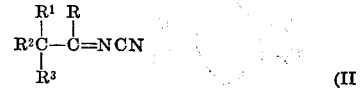

(II)

which are likewise obtained by reaction of cyanogen azide with monomeric ethylenic compounds of formula $R(R^1)C=(R^2)R^3$, wherein the R's have the previously indicated meanings. A preferred group of N-cyanoalkylideneimines are those of the formula

(III)

wherein $R^4$ is cyclopentylidene or bicycloheptylidene.

A wide variety of monomeric ethylenically unsaturated compounds can be reacted with cyanogen azide in preparing the N-cyanoaziridines and/or the N-cyanoimines of this invention. The ethylenic compound can be monoethylenic or polyethylenic, cyclic or acyclic, and substituted or unsubstituted. When the ethylenic compound contains one or more substituents, i.e., when it is not wholly hydrocarbon, such substituent, if electron withdrawing, is preferably at least one carbon removed from the ethylenically unsaturated carbon atoms. There is no preference or restriction for the location of electron-donating substituents as reactions proceed readily whatever the relative position of the substituent with respect to the ethylenically unsaturated carbon. Some polymerization of the ethylenic compound may occur as a side reacion, particularly in the case of readily polymerizable vinyl compounds.

Examples of simple monomeric monoethylenic compounds which can be used include ethylene, propylene, 3-phenyl-1-propene, butene-1, butene-2, isobutylene, hexenes, octenes, dodecenes, octadecenes, 1,2-dimethylcyclopropene, cyclobutene, cyclopentene, methylenecyclobutane, methylcyclopentene, methylenecyclopentane, methlenecyclohexane, cyclohexene, cycloheptene, cyclodecene, cyclododecene, vinylcyclohexane, bicycloheptene, styrene, p-ethylstyrene, β-vinylnaphthalene, stilbene, and substituted monoethylenic compounds, such as allyl bromide, allyl alcohol, allyl acetate, allyl phenol, vinyl chloride, vinyl fluoride, vinylidene chloride, vinylidene fluoride, tetrafluoroethylene, vinyl methyl ketone, allyl phenyl ether, vinyl ethyl ether, vinyl phenyl ether, dihydrofuran, dihydropyran, vinyl ethyl sulfide, vinyl acetate, vinyl butyrate, nitroethylene, 3-nitro-1-propene, p-nitrostyrene, acrylonitrile, methacrylonitrile, 1,4-dicyanobutene-2, allyl cyanide, acrylic acid, crotonic acid, maleic acid, cinnamic acid, ethyl crotonate, butyl acrylate, benzyl acrylate methyl methacrylate, acrylamide, N-diethyl acrylamide, m-iodostyrene, p-cyanostyrene, o-hydroxystyrene, o-methoxystyrene, and 2-(β,β-dicyano-α-hydroxyvinyl)-4-methylphenol (U.S. 2,726,249).

Typical examples of dienes and other polyenes that can be used as the ethylenic reactant are butadiene, isoprene, chloroprene, 2,4-hexadiene, diallyl, cyclopentadiene, dicyclopentadiene, vinyl cyclohexene, divinyl ether, 1,5-cyclooctadiene, 1,3,5-hexatriene, and cyclooctatetraene.

The preferred unsaturated reactants are substituted and unsubstituted ethylenic (i.e., olefinic) hydrocarbons of the formula $R(R^1)C=C(R^2)(R^3)$, particularly those of 2–12 carbons. Halogen, cyano, hydroxy, carboxyl, alkoxy, and alkoxy carbonyl are the preferred substituents for the substituted hydrocarbon reactants.

EMBODIMENTS OF THE INVENTION

There follow some examples which are intended to illustrate, but not to limit, the invention. Examples 1–27 illustrate the reaction of cyanogen azide with ethylenically unsaturated compounds and the products obtained thereby. Some of these examples show isolation of the principal product only, whereas others, where both the N-cyanoaziridine and the N-cyanoimines are formed in substantial amounts, show the isolation of both products.

EXAMPLE 1

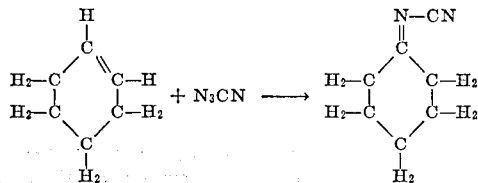

A 100-ml. flask equipped with a wet-ice condenser, magnetic stirrer, gas-inlet tube, and nitrogen bubbler was assembled, flame-dried and cooled to ambient temperature under nitrogen. Sodium azide (3.25 g., 0.05 mole, sieved through a 60 mesh screen) was added and the flask cooled in a solid carbon dioxide-acetone bath. Cyanogen chloride (28.8 g., 0.47 mole) was condensed into the flask and allowed to warm to reflux temperature for 24 hours under nitrogen. Pure cyclohexene (20 ml., 16.2 g., 0.197 mole) was then added during ½ hour. The mixture was stirred at room temperature for 15 hours and finally warmed slowly to 68° C. during 1½ hours. The resulting slurry of product and sodium chloride was cooled to room temperature, diluted with acetone (20 ml., 15.8 g., 0.27 mole), and filtered. Removal of the solvent from the filtrate under reduced pressure gave 5.75 g. (yield 94%) of a light straw-colored oil. Distillation of this oil in an acid-washed still gave 4.55 g. (74.5% yield) of pure 1-N-cyanoiminocyclohexane (b.p. 25–26° C./0.2µ; $n_D^{25}$, 1.5025).

Analysis.—Calcd. for $C_7H_{10}N_2$: C, 68.81; H, 8.24; N, 22.93. Found: C, 69.01; H, 8.42; N, 23.35, 23.09.

Infrared analysis of this product showed strong absorption at 4.55µ and 6.15µ, which is consistent with the structure of the product.

1-N-cyanoiminocyclohexane obtained as above polymerized readily when heated and the polymer thus obtained is useful as a protective coating.

EXAMPLE 2

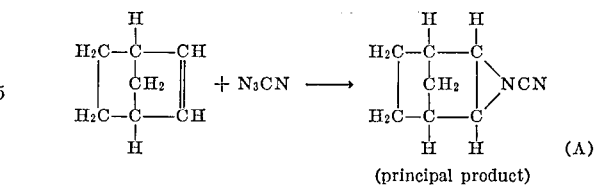

(principal product)

Using essentially the procedure described in Example 1, sodium azide (19.5 g., 0.3 mole, sieved through a 60 mesh screen), cyanogen chloride (115 g., 1.87 mole), and bicyclo[2.2.1]hept-2-ene (50 g., 0.54 mole) were refluxed (ca. 16–18° C.) for about 20 hours, during which time nitrogen was liberated. The mixture was then heated to 55° C. to remove excess cyanogen chloride, cooled to ambient temperature, and then diluted with 50 cc. (39.6 g.) of dry acetone. The mixture was filtered under nitrogen to separate sodium chloride and the solvent removed from the filtrate on a rotary evaporator at 0.3 mm./50° C. thereby leaving 5 g. of product mixture. This mixture consisted of approximately 80% of the N-cyanoaziridine, 3-cyanoazatricyclo[3.2.1.0$^{2,4}$]octane, shown in formula A above, and 20% of the N-cyanoalkylideneimine, bicyclo [2.2.1]heptane-2-N-cyanoimine, formula B, below:

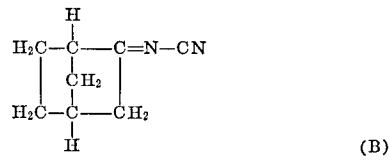

The components of the above mixture (5 g.) were separated and identified as follows: The mixture was passed over a column packed with 160 g. of a neutral hydrous alumina. The column was eluted with benzene, and the solvent was evaporated yielding a colorless, mobile liquid whose infrared spectrum was the same as that of the starting material, except for the following:

(a) The original band at 6.1µ (>C=N) was absent.
(b) A new band appeared at 5.75µ (>C=O).

The new band was attributed to norcamphor from the hydrolysis of the bicyclo[2.2.1]heptan-2-N-cyanoimine (compound B). Distillation of the chromatographed mixture removed the volatile norcamphor which was isolated and identified as its 2,4-dinitrophenylhydrazone derivative, melting point 130° C. The 5.75µ band was absent in the remaining liquid. The remainder of the spectrum was unchanged. This material was assigned the structure of compound A, 3-cyanoazatricyclo[3.2.1.0$^{2,4}$]octane.

The structure of the N-cyanoaziridine derivative was further verified by reduction with lithium aluminum hydride as follows:

To 300 ml. of dry diethyl ether in a 500-ml. flask, equipped with a magnetic stirrer and drying tube, 3 g. (0.08 mole) of lithium aluminum hydride was added. The mixture was stirred at room temperature for 24 hours, and there was then added 2.5 g. (0.02 mole) of the adduct of cyanogen azide with bicyclo[2.2.1]hept-2-ene in 35 ml. of diethyl ether over a period of 30 minutes. The reaction mixture was stirred for 26 hours at room temperature and was then decomposed with a saturated solution of sodium sulfate. The inorganic salts were removed by filtration and the filtrate evaporated to yield 2.3 g. of a mobile amine-smelling liquid. The nitrile band (4.5µ) in the infrared spectrum was essentially absent.

To 900 mg. of the amine obtained as above in 7 ml. of cyclohexane there was added 2 g. (0.015 mole) of phenyl isothiocyanate. The exothermic reaction which ensued was cooled in an ice bath and the resultant solid triturated with 40 ml. of cyclohexane. It was then filtered to yield 1.3 g. of a product melting at 100–113° C. Recrystallization from ethanol or benzene in petroleum ether mixture gave white needles melting at 116–118° C.

The infrared and nuclear magnetic resonance spectra were in accord with the structure of 3-azatricyclo-[3.2.1.0²·⁴]octane-3-thiocarboxanilide:

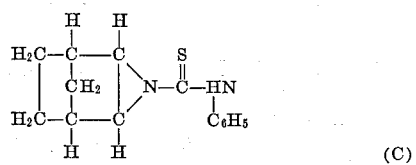

Analysis.—Calcd. for C₁₄H₁₆SN₂: C, 68.8; H, 6.6; N, 11.5; S, 13.12. Found: C, 68.86, 68.86; H, 6.68, 6.72; N, 11.33, 11.39; S, 13.23, 13.47.

EXAMPLE 3

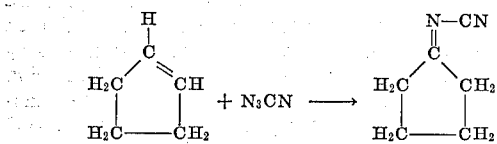

A 300-ml. flask equipped with an ice-cooled condenser, gas inlet, nitrogen bubbler, and magnetic stirrer was assembled, flame-dried, and cooled to ambient temperature under nitrogen. Sodium azide (9.75 g., 0.15 mole, sieved through a 60 mesh screen) was added and the flask cooled in a solid carbon dioxide-acetone bath, while pure cyclopentene (30 cc., 23.2 g., 0.34 mole) and cyanogen chloride (40 ml., 48.8 g., 0.79 mole) were added. The mixture was allowed to reflux, with stirring, for 22 hours, during which time nitrogen was liberated. The excess cyanogen chloride was then removed by heating at 50° C. for one hour. The resulting slurry was cooled to 10° C., diluted with dry ether (50 ml., 35.5 g., 0.47 mole), and filtered under nitrogen. Removal of the solvent from the filtrate on a rotary evaporator at 1 mm./40° C. gave 15.85 g. (98% yield) of an almost colorless oil. Distillation of this oil in an acid-washed short path still gave pure 1-N-cyanoiminocyclopentane (15.2 g., 94% yield; $n_D^{25}$, 1.4944). The melting point of the main fractions ranged from −20.5 to −21° C., as determined by differential thermal analysis. Mass spectrographic and infrared analysis of the product were in good agreement with the structure 1-N-cyanoiminocyclopentane.

Elemental analysis and molecular weight determinations on a sample obtained from a duplicate experiment were as follows:

Analysis.—Calcd. for C₆H₈N₂: C, 66.64; H, 7.45; N, 25.91. Found: C, 67.09; H, 7.76; N, 25.62.

Mol. wt. calcd. for C₆H₈N₂: M.W., 108.15. Found: M.W., 99, 98 (freezing point in benzene).

Hydrolysis of the 1-N-cyanoiminocyclopentane yielded cyclopentanone, cyanamide, and urea, as illustrated below.

1-N-cyanoiminocyclopentane, prepared as in Example 3 (5.40 g., 0.05 mole), and ether (10 ml., 7.1 g.) were added to distilled water (25 ml., 25 g.), acidified with 10% sulfuric acid (6 drops), and the mixture was heated with stirring at 45–49° C. for five hours. After standing at room temperature for 16 hours, the temperature of the reaction mixture was raised to 54° to 59° C., where it was held for 3¾ hours. The solution was then cooled to ambient temperature and evaporated to dryness on a rotary evaporator at 0.3 mm./40° C. There remained a white solid A (2.35 g.) and a volatile portion B. Extraction of A with ether and evaporation of the extract to dryness separated pure crystalline cyanamide (1.65 g., yield 78.6%) which was identified by comparison of its infrared spectrum with a known sample and by infrared and elemental analysis of the silver salt.

Analysis.—Calcd. for Ag₂NCN: N, 10.95. Found: N, 11.36, 11.44.

The ether-insoluble fraction A (0.65 g., yield 21.6%) was chiefly urea (m.p. 130–133.5° C.). After one re-crystallization from acetone there was obtained 0.55 g. of urea melting at 131–133.5° C. A second recrystallization from absolute ethyl alcohol and ether gave pure urea (0.40 g., m.p. 135–136° C., yield 13.3%) which was identical in melting and mixed melting point with an authentic sample.

Extracting the volatile fraction B with ether in a continuous extractor followed by drying the extract over magnesium sulfate, filtering, and removing the solvent from the filtrate on an efficient column gave cyclopentanone (3.1 g., yield 74%) which was identified by infrared analysis, and by a 2,4-dinitrophenylhydrazone derivative (m.p. 145.6–146.2° C.). A mixed melting point of this derivative with the 2,4-dinitrophenylhydrazone prepared from an authentic sample of cyclopentanone was not depressed (mixed melting point 145.6–146.4° C.).

To a flask equipped with a condenser, dropping funnel, magnetic stirrer, and thermometer was added silver nitrate (17.0 g., 0.1 mole) and distilled water (50 ml., 5 g., 2.8 moles). When solution was complete, 1-N-cyanoiminocyclopentane, prepared as described above (5.41 g., 0.05 mole), was added over a period of five minutes. A mild exothermic reaction occurred and a small amount of yellow precipitate formed. Ether (5 ml., 3.6 g.) was added and the mixture heated at 40–50° C. for 20 minutes, and then cooled to ambient temperature. Addition of ammonium hydroxide (20 ml., 14%=2.8 g. NH₄OH+17.42 g. H₂O) caused additional yelow precipitate to form. The solid product was separated by filtration, washed on the filter with distilled water, and dried over P₂O₅ at 0.1 mm./60–70° C. (weight 12.70 g., yield 99.3%). The infrared spectra of this compound was idenical with that of a known sample of silver cyanamide.

Analysis.—Calcd. for Ag₂CN₂: Ag, 84.35; C, 4.69; N, 10.95. Found: Ag, 83.03; N, 11.03.

The filtrate was extracted with ether in a continuous extractor for 20 hours, the ether layer dried over anhydrous magnesium sulfate, filtered, and the ether removed by distillation. There remained 4.0 g. (95% yield) of product containing cyclopentanone, identified by infrared analysis. Distillation of the crude product gave 3.73 g. (89% yield) of material having an $n_D^{25}$ of 1.4353 and whose infrared spectrum was identical with that of authentic cyclopentanone.

EXAMPLE 4

$$H_3C-\underset{\underset{CH_3}{|}}{\overset{\overset{CH_3}{|}}{C}}-CH=CH_2 + N_3CN \longrightarrow$$

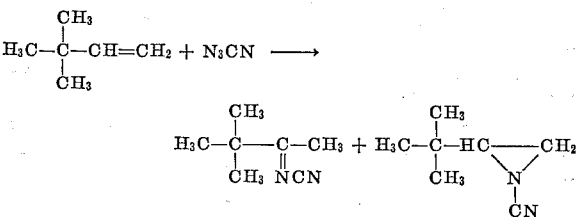

To a solution of cyanogen azide prepared as described in Example 5 from activated sodium azide (19.50 g., 0.3 mole) and cyanogen chloride (67 g., 1.1 mole) in acetonitrile (120 ml., 93.5 g., 2.28 mole) was added 3,3-dimethyl-1-butene (57 g., 0.68 mole). The mixture was heated at 34–43° C. for 15 hours, during which time ca. 0.3 mole of nitrogen was liberated. Continued heating at this temperature for 1½ additional hours caused no further nitrogen evolution. After cooling to room temperature the mixture was diluted with ether, filtered, and the solvent and excess olefin removed in a rotary evaporator at 0.3 mm. and room temperature. There remained 35.61 g. (95.5% yield) of a light tan mobile oil. Distillation of this oil through a molecular type still at 0.3 mm. gave 29.58 g. (79.4% yield) of mixture of isomers consisting of ca. 74% 2,2-dimethyl-3-N-cyanoiminobutane and 26% 2-tertiary butyl-1-N-cyanoaziridine. Fractionation of 22.78 g. of this material through a 17 in. x 8 mm. spinning band column separated pure 2,2-dimethyl-3-N-cyanoiminobutane. Infrared and N-M-R analysis of the lower boiling fractions indicated that it contained major amounts of 2-tertiary butyl-1-cyano-aziridine.

EXAMPLE 5

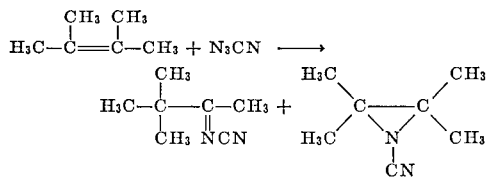

A 500-ml. flask equipped with an ice-cooled condenser, magnetic stirrer, dropping funnel, nitrogen bubbler, and gas-inlet tube was assembled, flame-dried, and cooled to ambient temperature under nitrogen. Sodium azide (32.5 g., 0.5 mole) and dry acetonitrile (200 ml., 156.6 g.) were added and the flask cooled in an ice-salt bath. Cyanogen chloride (80 ml., 97.4 g., 1.58 mole) was distilled into the reaction mixture over a period of 1¾ hours at such a rate as to maintain the temperature between 4–18° C. When addition was complete, the reaction mixture was warmed to 25° C. and 2,3-dimethyl-2-butene (88.25 g., 1.05 mole) was added rapidly through the dropping funnel. During a reaction period of 14 hours at 30–38° C., ca. 0.5 mole of nitrogen evolved. Heating at this temperature was continued for an additional two hours. The mixture was cooled to room temperature, diluted with ether (100 ml., 71.4 g.), filtered, and the solvent removed from the filtrate on a rotary evaporator at 0.3 mm. and room temperature. There remained 60.65 g. (98% yield) of a mixture of isomeric products. Distillation of the total product through a molecular type still at 0.1 mm. and a bath temperature of 32–47° C. gave a colorless oil (60.34 g., 97.2% yield) consisting of ca. 92% 2,2-dimethyl-3-N-cyanoiminobutane and 8% 1-cyano-2,2,3,3-tetramethylaziridine as determined by N-M-R spectra. Fractionation of a 31.7 g. aliquot of this oil through a 17 in. x 8 mm. spinning band column separated pure 2,2-dimethyl-3-N-cyanoiminobutane (b.p. 38–40° C./0.05 mm.; $n_D^{25}$, 1.4570).

*Analysis.*—Calcd. for $C_7H_{12}N_2$: C, 67.69; H, 9.74; N, 22.56. Found: C, 68.07; H, 9.85; N, 23.02.

A slightly lower boiling fraction (b.p. 36° C./0.03 mm.; $n_D^{25}$, 1.4561) consisted predominantly of 1-cyano-2,2,3,3-tetramethylaziridine.

*Analysis.*—Calcd. for $C_7H_{12}N_2$: C, 67.69; H, 9.74; N, 22.56. Found: C, 67.92; H, 9.73; N, 22.61.

2,2-dimethyl-3-N-cyanoiminobutane was identified by infrared and N-M-R spectra and by hydrolysis to pinacolone and cyanamide. 1-cyano-2,2,3,3-tetramethylaziridine was identified by its characteristic unsplit resonance at −83 cps. relative to tetramethylsilane.

EXAMPLE 6

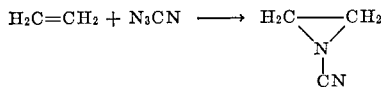

An acetonitrile solution (55 ml.) containing 13.6 g. (0.20 mole) of cyanogen azide was placed in a 240-ml. nickel-molybdenum-iron alloy-lined tube and pressured with 18 g. (0.64 mole) of ethylene. The tube was held at 21–27° C. for 20 hours, during which time the internal pressure rose from 480 p.s.i. to 740 p.s.i. The resulting solution was poured into 500 ml. of ether and about 3 g. of poylmeric material was removed by filtration. After the filtrate was evaporated to 5.5 g., the residue was distilled through a short path still at a pot temperature of 30–35° C./0.2 mm. to give about 2 g. (15%) of 1-cyanoaziridine, a colorless oil.

*Analysis.*—Calcd. for $C_3H_4N_2$: C, 52.9; H, 5.9; N, 41.2. Found: C, 51.8; H, 5.9; N, 41.3.

Infrared analysis of this product showed strong absorption at 4.50μ (—C≡N) and 6.80μ, 6.90μ (—CH₂), with no absorption at 6.0–6.2μ characteristic of the >C=N— group, and none at 7.2–7.4μ (—CH₃). The N-M-R spectrum shows only one absortpion at τ=7.53.

EXAMPLE 7

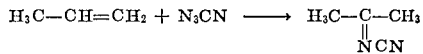

A mixture of 3.25 g. (0.05 mole) of sodium azide and 20.3 g. (26 ml.) of acetonitrile was placed in an 80 ml. nickel-molybdenum-iron alloy-lined tube. The tube was cooled, and 6 g. (0.10 mole) of cyanogen chloride and 6 g. (0.14 mole) of propylene were added. The reactor was sealed and the charge held at 35° C. for 16 hours, during which time the pressure rose from 80 to 290 p.s.i. At this point, 7.7 g. (0.11 mole) of cyclopentene was added to decompose any residual cyanogen azide. However, over a period of four hours there was no pressure rise so the product was removed from the reactor, filtered to remove sodium chloride, and evaporated on a rotating evaporator to remove low boiling material. On distillation through a short path still, 0.80 g. (19%) of 2-N-cyanoiminopropane, distilling at a pot temperature of 30–46° C. with a pressure of 0.1–0.5 mm., $n_D^{25}$, 1.4480, was obtained.

*Analysis.*—Calcd. for $C_4H_6N_2$: C, 58.5; H, 7.4; N, 34.1. Found: C, 59.1, 58.9, 58.6; H, 7.6, 7.6; N, 34.0, 34.2.

The infrared absorption spectrum showed strong absorption at 4.50μ and 6.11μ characteristic of —C≡N and >C=N— groups. The N-M-R spectrum had peaks at τ=7.59, 7.72.

EXAMPLE 8

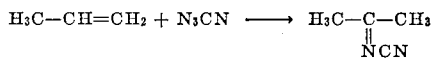

Each of two 80 ml. nickel-molybdenum-iron alloy-lined pressure tubes was charged with 6.5 g. (0.10 mole) of sodium azide and 20.3 g. (26 ml.) of acetonitrile. The tubes were cooled and to one was added 12 g. (0.20 mole) of cyanogen chloride and 13 g. (0.31 mole) of propylene. The other was charged with 13 g. (0.21 mole) of cyanogen chloride and 12 g. (0.30 mole) propylene. The sealed tubes were then shaken at 35–37° C. for 18 hours. The contents were then combined and filtered to remove sodium chloride. The filtrate was evaporated on a rotating evaporator and the residual oil was distilled on a molecular-type still to give 9.26 g. (57%) of 2-N-cyanoiminopropane ($n_D^{25}$, 1.4478–1.4488) and 30% of polymeric residue.

EXAMPLE 9

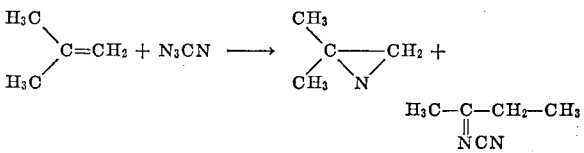

Two 80 ml. nickel-molybdenum-iron alloy-lined pressure vessels were charged with 6.5 g. (0.1 mole) of sodium azide and 20.3 g. (26 ml.) of acetonitrile, and to each was added 12 g. (0.20 mole) of cyanogen chloride and 16 g. (0.29 mole) of isobutylene. After the tubes were shaken for 20 hours at 35–36° C., the contents were removed, combined, filtered to remove the salt, and the filtrate was evaporated to remove volatile material. Distillation through a molecular-type still gave 50% yield of a mixture of 2,2-dimethyl-1-cyanoaziridine and 2-N-cyanoiminobutane, boiling at a pot temperature of 40°–50° C./0.25 mm.

*Analysis.*—Calcd. for $C_5H_8N_2$: C, 62.5; H, 8.4; N, 30.1. Found: C, 62.3, 62.1; H, 8.1, 8.2; N, 29.8.

In a similar experiment carried out at 26–27° C., an 82% yield of the $C_5H_8N_2$ mixture was obtained, which was shown by N-M-R to be 41% 2,2-dimethyl-1-cyanoaziridine and 59% 2-N-cyanoiminobutane.

If the above reaction is repeated using benzene as the medium, the mixture consists of 77% 2-N-cyanoiminobutane and 23% 2,2-dimethyl-1-cyanoaziridine. With ethyl acetate as the medium, the mixture consists of 54% 2-N-cyanoiminobutane and 46% 2,2-dimethyl-1-cyanoaziridine.

In a duplication of the first of the above experiments, the isomer mixture was distilled through a 24 in. x 8 mm. spinning band column and an essentially pure sample of 2,2-dimethyl-1-cyanoaziridine was obtained, b.p. 24–25° C./0.4 mm.; $n_D^{25}$, 1.4422.

*Analysis.*—Calcd. for $C_5H_8N_2$: C, 62.5; H, 8.4. Found: C, 62.7; H, 8.2.

The N-M-R spectrum showed a sharp singlet at $\tau=8.57$ for the methyl groups and a singlet at $\tau=7.66$ for the methylene protons.

From this same distillation was obtained essentially pure 2-N-cyanoiminobutane, b.p. 30° C./0.4 mm.; $n_D^{25}$, 1.4517.

The N-M-R of the 2-N-cyanoiminobutane shows absorption at $\tau=8.72$, 8.83, 8.96, and 7.20, 7.32, 7.43 (7.56) for the ethyl group and $\tau=7.58$ and 7.71 for the stereoisomeric *syn*-cyanomethyl group and *anti*-cyanomethyl group, respectively.

EXAMPLE 10

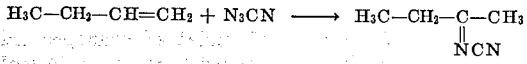

Two 80 ml. nickel-molybdenum-iron alloy-lined pressure tubes were each charged with 6.5 g. (0.10 mole) of sodium azide and 20.3 g. (26 ml.) of acetonitrile, cooled and to each was added 12 g. (0.20 mole) of cyanogen chloride and 16 g. (0.29 mole) of 1-butene. The tubes were heated at 28–36° C. for 18 hours, and after the resulting products were combined, they were filtered to remove sodium chloride, and the filtrate evaporated to remove solvent and unreacted starting material. Distillation on a molecular-type still afforded 3 g. (15%) of 2-N-cyanoiminobutane; $n_D^{25}$, 1.4532.

*Analysis.*—Calcd. for $C_5H_8N_2$: C, 62.5; H, 8.4; N, 30.1. Found: C, 62.7, 62.4; H, 8.6, 8.4; N, 29.3.

The N-M-R spectrum showed this to be a pure material.

EXAMPLE 11

$H_3C-CH_2-CH=CH_2 + N_3CN \longrightarrow H_3C-CH_2-\underset{\underset{NCN}{\|}}{C}-CH_3$ To a cooled mixture of 40.6 g. (52 ml.) of acetonitrile and 13.0 g. (0.20 mole) of sodium azide in a 240 ml. nickel-molybdenum-iron alloy-lined pressure reactor tube was added 24 g. (0.40 mole) of cyanogen chloride and 32 g. (0.57 mole) of 1-butene. The mixture was shaken for 16 hours at 27–35° C., filtered to remove sodium chloride, and evaporated on a rotating evaporator to remove 1-butene, cyanogen chloride, and solvent. The residue consisted of 16.5 g. (86%) of essentially pure 2-N-cyanoiminobutane, which was distilled through a short path still to give 9.6 g. (50%) of the pure 2-N-cyanoiminobutane along with quite a large amount of polymer.

EXAMPLE 12

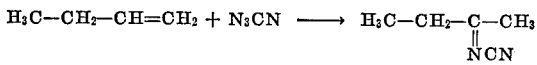

Into each of two cooled 80 ml. nickel-molybdenum-iron alloy-lined pressure vessels, charged with 6.5 g. (0.10 mole) of sodium azide and 20.3 g. (26 ml.) of acetonitrile, was distilled 12 g. (0.20 mole) of cyanogen chloride and 16 g. (0.29 mole) of *cis*-2-butene. These mixtures were heated at 32–36° C. for 18 hours, combined, filtered to remove sodium chloride, and the filtrate was evaporated on a rotary evaporator to remove the volatiles, leaving 16.5 g. (86%) of crude 2-N-cyanoiminobutane. On distillation at a pot temperature of 35–41° C. and 0.25–0.15 mm., 13.01 g. (68%) of the pure 2-N-cyanoiminobutane, $n_D^{25}$, 1.4528–1.4538, was obtained.

*Analysis.*—Calcd. for $C_5H_8N_2$: C, 62.5; H, 8.4; N, 30.1. Found: C, 62.3, 62.5; H, 8.5, 8.5; N, 29.8, 30.0.

Proton magnetic resonance showed the crude material to be almost pure 2-N-cyanoiminobutane.

EXAMPLE 13

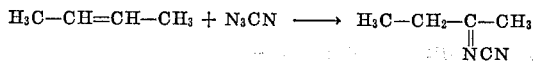

Cyanogen chloride (12 g., 0.20 mole) and *trans*-2-butene (16 g., 0.29 mole) were consecutively added to a cooled 80 ml. nickel-molybdenum-iron alloy-lined pressure vessel containing 6.5 g. (0.10 mole) of sodium azide and 19.5 g. (25 ml.) of acetonitrile. After shaking for 19 hours at 24–28° C., the contents were removed, filtered to remove the sodium chloride, and the filtrate evaporated under reduced pressure to remove unreacted reactants and solvent. The crude residue (7.45 g., 78%) was shown by N-M-R to be nearly pure 2-N-cyanoiminobutane. On distillation at a pot temperature of 27–52° C. and 0.35–0.45 mm., 4.34 g. (45%) of pure 2-N-cyanoiminobutane, $n_D^{25}$, 1.4530–1.4540, was obtained.

*Analysis.*—Calcd. for $C_5H_8N_2$: C, 62.5; H, 8.4; N, 30.1. Found: C, 62.5, 62.5; H, 8.5, 8.4; N, 30.1.

EXAMPLE 14

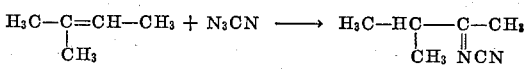

A mixture of 3.25 g. (0.05 mole) of sodium azide and 20 ml. (24 g., 0.40 mole) of cyanogen chloride was stirred for three hours in a 50 ml. flask fitted with a condenser, dropping funnel, and thermometer and connected to a wet test meter and 10 ml. (6.7 g., 0.097 mole) of 2-methyl-2-butene was added. After 16.5 hours at 20° C., 915 ml. (73%) of nitrogen was evolved. An additional 5 ml. (3.3 g., 0.047 mole) of 2-methyl-2-butene was added along with 10 ml. (7.8 g.) of acetonitrile, and the reaction mixture was heated at 30–48° C. for 4.7 hours, during which time another 250 ml. (20%) of nitrogen was evolved. The reaction mixture was then cooled, filtered to remove sodium chloride, and the filtrate was evaporated to remove cyanogen chloride, olefin, and acetonitrile. The residual oil was distilled through a short path still to give 3.6 g. (66%) of 2-methyl-3-N-cyanoiminobutane boiling at a pot temperature of 40–50° C./ 0.1 mm.; $n_D^{25}$, 1.4521–1.4528.

*Analysis.*—Calcd. for $C_6H_{10}N_2$: C, 65.5; H, 9.2; N, 25.4. Found: C, 65.4; H, 9.2; N, 25.6.

In a duplication of the above experiment, the N-M-R spectrum of the product was shown to consist of peaks at $\tau=7.58$, 7.78 for the *syn*- and *anti*-cyanomethyl groups, a doublet at 8.79 and 8.88 for the isopropyl methyls and a seven line pattern from $\tau=6.85–7.53$ for the isopropyl —CH.

EXAMPLE 15

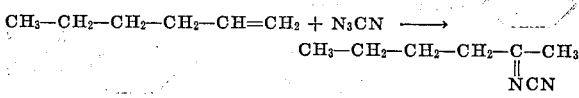

A mixture of 3.25 g. (0.05 mole) of sodium azide, 24 g. (20 ml., 0.38 mole) of cyanogen chloride, and 13.4 g. (20 ml., 0.16 mole) of 1-hexene was stirred at room temperature for 22 hours, then at 31–48° for ½ hour, during which time 815 ml. (63%) of nitrogen was evolved. The mixture was filtered to remove sodium chloride, and the filtrate was concentrated using a rotating evaporator. Distillation of the oily residue gave 2.35 g. (38%) of 2-N-cyanoiminohexane, $n_D^{25}$, 1.4567–1.4570, boiling at a pot temperature of 41–47° C./0.07 mm.

*Analysis.*—Calcd. for $C_7H_{12}N_2$: C, 67.8; H, 9.8; N, 22.6. Found: C, 67.6; H, 9.4; N, 23.2, 23.4.

The structure of the 2-N-cyanoiminohexane was proved by treatment with aqueous silver nitrate solution which gave a yellow precipitate, shown to be silver cyanamide, and a water solution from which 2-hexanone was extracted with ether. The identity of the ketone was shown by its conversion to the semicarbazide derivative, m.p. 121–122° C. (reported 121° C. in Shriner and Fuson, "Identification of Organic Compounds").

EXAMPLE 16

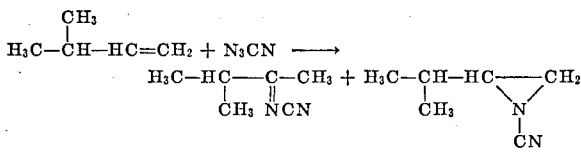

Each of two 80 ml. nickel-molybdenum-iron alloy-lined tubes was charged with 6.5 g. (0.1 mole) of sodium azide and 20.3 g. (26 ml.) of acetonitrile, cooled, and to each was added 12 g. (0.20 mole) of cyanogen chloride and 20 g. (0.29 mole) of 3-methyl-1-butene. The sealed tubes were heated at 23–40° C. for 19 hours, after which the combined products were filtered to remove sodium chloride. The filtrate was concentrated on a rotating evaporator and distillation through a 24 in. x 8 mm. spinning band column gave a 41% yield of a crude mixture of 3-methyl-2-cyanoiminobutane and 2-isopropyl-1-cyanoaziridine, along with 36% of polymeric residue.

The first fraction from the distillation had a boiling point of 38–39° C./0.35 mm. and was shown by N-M-R to be about 90% 2-isopropyl-1-cyanoaziridine, while higher boiling fractions, b.p. 42° C./0.40 mm., were shown to be nearly pure 3-methyl-2-N-cyanoiminobutane.

In a similar experiment at 26–27° C., an 86% yield of the isomer mixture was obtained.

EXAMPLE 17

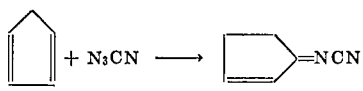

To 41 milliliters of acetonitrile solution containing 6.8 g. (0.10 mole) of cyanogen azide was added 33 g. (.50 mole) of cyclopentadiene. This solution was held at 0° C. for 7.4 hours, during which time 2.05 liters (81.5%) of nitrogen was evolved, excess cyanogen azide, and excess cyclopentadiene were removed on a rotating evaporator at 1 mm. pressure. Distillation at 1μ, using a mercury vapor pump, afforded 5.87 g. (55%) of 2-cyanoiminocyclopentene-1, b.p. 36–42° C., 1μ pressure; $n_D^{25}$, 1.5648.

Analysis.—Calcd. for $C_6H_6N_2$: C, 67.9; H, 5.7. Found: C, 68.1, 69,5; H, 5.8, 6.0.

The infrared spectrum showed absorption at 4.55μ, 6.25μ, and 6.37μ attributable, respectively, to the cyano group, and C=N and C=C groups, and in the fingerprint region the spectrum was quite similar to cyclopentenone.

EXAMPLE 18

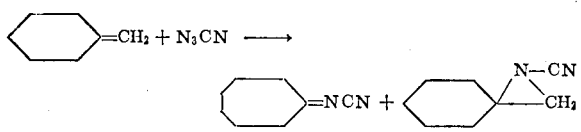

An acetonitrile solution (29 ml.) containing 6.8 g. (0.1 mole) of cyanogen azide was added to 20 g. (0.21 mole) of methylenecyclohexane (shown to be pure by gas chromatography). Nitrogen was liberated readily and over a period of 9 hours 1.99 l. of nitrogen (80%) was obtained, with a reaction temperature of 22–28° C. After removal of solvent and excess methylenecyclohexane on a rotating evaporator, 11.75 g. of crude product (87%) was obtained. Distillation at a pot temperature of 96°–103° C./1 mm. gave 8.30 g. (61%) of a mixture of 1-cyanoiminocycloheptane and 1-cyano-2-cyclopentamethyleneaziridine; $n_D^{25}$, 1.4880 to 1.5026.

Analysis.—Calcd. for $C_8H_{12}N_2$: C, 70.5; H, 8.9; N, 20.6. Found: C, 70.5, 70.5; H, 8.7, 8.9; N, 20.2, 20.4.

Proton magnetic resonance analysis indicated that the mixture contained 71% of the cyanoiminocycloheptane and 29% of the aziridine. This ratio changes with change of reaction medium, e.g., in ethyl acetate solution, 61% 1-cyanoiminocycloheptane and 39% of aziridine are formed while in benzene solution, 82% of cyanoiminocycloheptane and 18% of aziridine are produced.

The above process was repeated using 5 g. (0.05 mole) of methylenecyclohexane, 25 ml. of dimethylformamide, and 1.7 g. (0.025 mole) of cyanogen azide. After 16 hours at 25° C. there was obtained 2 g. of an oil which was shown by N-M-R spectroscopy to be pure 1-cyanoiminocycloheptane containing no 1-cyano-2-cyclopentamethyleneaziridine.

The above process was again repeated using 5 g. of methylenecyclohexane dissolved in 10 ml. of acetic acid and a small amount of 2.5 molar cyanogen azide in ethyl acetate at 40° C. After evaporation of the solvents and excess reactants, an oil was obtained whose N-M-R spectrum indicated that it was 100% 1-cyano-2-cyclopentamethyleneaziridine containing no 1-cyanoiminocycloheptane.

EXAMPLE 19

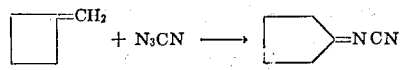

A solution of 6.8 g. (0.10 mole) of cyanogen azide in 28 ml. of acetonitrile was added to 0.5 g. (0.14 mole) of methylenecyclobutane at room temperature purified by preparative gas chromatography. Reaction was immediate and over a 6.3-hour period, 1.89 l. (75%) of nitrogen was evolved. After evaporation of solvent, 7.67 g. (79%) of crude adduct was obtained, which upon distillation through a short path still at a pot temperature of 55°–63.5° C./0.05–0.25 mm. gave 5.10 g. (52%) of 1-cyanoiminocyclopentane; $n_D^{25}$, 1.4928–1.4937.

Analysis.—Calcd. for $C_6H_8N_2$: C, 66.6; H, 7.5; N, 25.9. Found: C, 64.4, 64.0; H, 7.3, 7.4; N, 26.5, 26.5.

The nuclear magnetic resonance spectrum of this material was identical in all respects with the spectrum of the cyanoiminocyclopentane produced by the reaction of cyanogen azide with cyclopentene.

EXAMPLE 20

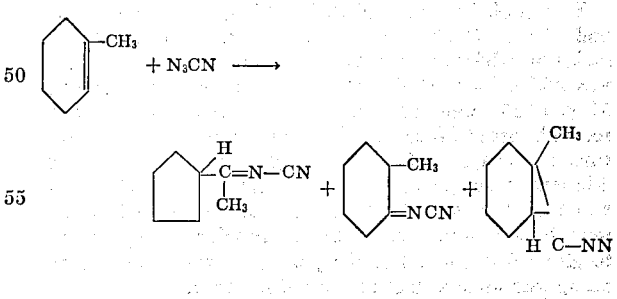

Forty milliliters of acetonitrile solution containing 10.2 g. (0.15 mole) of cyanogen azide was added to 24 g. (0.25 mole) of 1-methylcyclohexene, and over a 23.5-hour period 2.48 l. (66%) of nitrogen was evolved. After evaporation of the solvent, the crude product was investigated by N-M-R spectroscopy and three compounds were identified as constituents: 1-cyanoimino-2-methylcyclohexane, 45%; 1 - (1 - N-cyanoiminoethyl)-cyclopentane, 25%; and 1-cyano-2-methyl-2,3-cyclohexanylaziridine, 17%. Distillation of the mixture through a short path still at a pot temperature of 39–77° C./0.05–0.10 mm. gave 7.23 g. (35%) of the isomer mixture.

Analysis.—Calcd. for $C_8H_{12}N_2$: C, 70.6; H, 8.9; N, 20.6. Found: C, 70.3, 70.2; H, 9.7, 9.6.

EXAMPLE 21

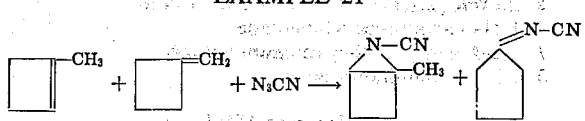

The reaction of cyanogen azide with methylenecyclobutane containing 6% 1-methylcyclobutene at room temperature gave predominantly 1-cyanoiminocyclopentane; however, N-M-R spectroscopy strongly indicates that a small amount of 1-cyano-2-methyl-2,3-cyclobutanylaziridine is present in the isomeric $C_6H_8N_2$ mixture.

EXAMPLE 22

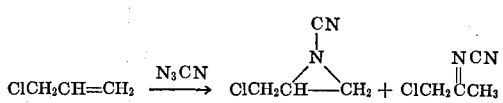

A solution of 1.9 g. (2.8 mmoles) of cyanogen azide in 1 ml. of carbon tetrachloride was added to 0.11 g. (1.4 mmole) of allyl chloride, and the mixture was allowed to stand for 2 hours at ambient temperature. The magnetic resonance spectra of the resulting solution was determined using a Varian high resolution N-M-R spectrometer and electromagnet as a frequency of 30 mc. and a field of 7500 gauss. The N-M-R spectrum indicated the presence of both 1-cyano-2-chloromethylaziridine and 2-cyanoimino-3-chloropropane.

EXAMPLE 23

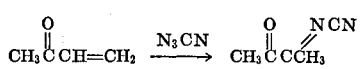

Following the procedure of Example 22, cyanogen azide and 0.10 g. (1.4 mmole) of methyl vinyl ketone were reacted with liberation of nitrogen. The N-M-R spectrum of the product indicated the presence of 2-cyanoiminopropanone-3.

EXAMPLE 24

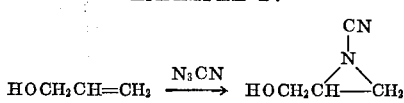

Allyl alcohol (0.08 g., 1.4 mmole) was treated with cyanogen azide according to the procedure of Example 22. The N-M-R spectrum of the resulting solution indicated the presence of 1-cyano-2-hydroxymethylaziridine in the reaction product.

EXAMPLE 25

Trimethylvinyl silane (0.1 g., 1 mmole) was added to cyanogen azide in carbon tetrachloride according to the procedure of Example 22. The N-M-R spectrum of the product mixture indicated that both 1-trimethylsilyl-1-cyanoiminoethane and 1 - cyano-2-trimethylsilylaziridine were present in the product mixture.

EXAMPLE 26

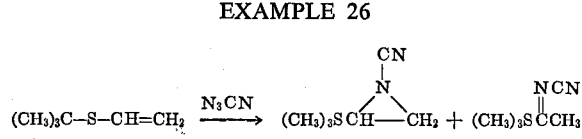

A cyanogen azide solution containing 0.19 g. (2.81 mmole) in 1 ml. of carbon tetrachloride was added to 0.1 g. (1 mmole) of tertiary butyl vinyl sulfide according to the procedure of Example 22. The N-M-R spectrum of the product indicated presence of both 1-cyanoimino-1-tertiary butylthioethane and 1-cyano-2-tertiary butyl thioaziridine.

EXAMPLE 27

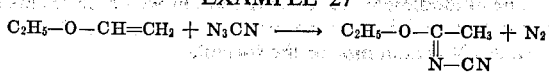

Cyanogen azide was prepared by stirring sodium azide (6.5 g., 0.1 mole) and cyanogen chloride (50 ml.) at reflux temperatures for 20 hours. To this mixture was added ethyl vinyl ether (8.2 g., 0.11 mole) dissolved in diethyl ether (20 ml.) over a period of 15 minutes, while maintaining the reaction temperature at 16–18° C. The reaction mixture was stirred at this temperature for a total of 45 minutes during which time approximately 0.1 mole of nitrogen was liberated. The reaction mixture was diluted with diethyl ether (15 ml.) and filtered under nitrogen. Removal of volatile components from the filtrate at 0.2 mm. pressure and room temperature gave a light tan mobile oil (10.8 g., 96% yield). Distillation of this oil in a short path still at 0.1 mm. and a bath temperature of 60–88° C. gave 3.35 g. of distillate and a tan brittle residue (6.8 g.). Analysis of the volatile fraction gave the following results:

*Analysis.*—Calcd. for $C_5H_8N_2O$: C, 53.55; H, 7.19; N, 24.98. Found: C, 50.52; H, 7.48; N, 24.60, 24.66, 24.82.

The infrared analysis showed strong absorption at 3.35, 3.45$\mu$ (C–H), 4.45$\mu$ (C≡N), 6.15$\mu$ (C=N), and in the 8$\mu$ region (C–O). These data indicate that the product consists principally of 1-ethoxy-1-N-cyanoiminoethane, i.e.,

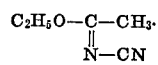

When other reactants are substituted for the ethyl vinyl ether of Example 27 there are obtained other cyanoimines coming within the scope of the invention. For example substitution of methyl vinyl ether results in 1-methoxy-1-N-cyanoiminoethane. Substitution of 1-chloro-2-methoxyethylene and 1,2-diethoxyethylene results in, respectively, 1-methoxy-1-N-cyanoimino-2-chloroethane and 1,2-diethoxy-1-N-cyanoiminoethane.

The reaction of cyanogen azide with ethylenic compounds can be used as an analytical means for determining the approximate extent of ethylenic unsaturation in an unknown composition by measuring the amount of nitrogen liberated.

This invention also provides a means for converting ethylenically unsaturated compounds to useful carbonyl compounds. As shown by Example 3, for instance, the reaction product of cyclopentene with cyanogen azide is readily converted to cyclopentanone by simple hydrolysis. Cyclopentanone is a polymer solvent, and it can be converted by oxidation with nitric acid to glutaric acid, which can be reacted with amines and glycols, respectively, to form useful polyamides and polyesters. As is further shown in Example 3, cyanamide is another product of the hydrolysis. Cyanamide is a valuable intermediate, e.g., for preparing resins of the amide-formaldehyde type.

The products obtained from monomeric ethylenically unsaturated compounds are useful as adhesives for bonding neoprene to itself, to natural rubber, and to other substrates. For example, when a small sample of the 1-cyanoiminocyclopentene-2 of Example 17 was spread between two ⅛″ neoprene sheets and the sheets pressed together at 130° C. and 2000 p.s.i. for 5 minutes, a strong bond between the neoprene sheets was formed. Similarly, ⅛″ thick strips of neoprene and natural rubber were firmly joined by pressing a small sample of 2,2-dimethyl-1-cyanoaziridine, prepared as in Example 9, between them and heating at 100° C. and 4000 p.s.i. for 2 minutes.

Since obvious modifications and equivalents will be evident to those skilled in the chemical arts, I propose to be bound solely by the appended claims.

The embodiments of the invention in which an exclusive property or privilege is claimed are defined as follows:
1. An N-cyanoimine of the formula

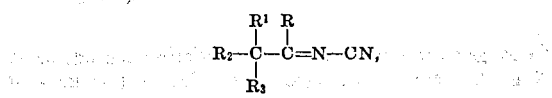

wherein the R's taken individually, contain up to 18 carbons and are members of the group consisting of hydrogen, alkoxy and hydrocarbyl and any two R's may be joined to form a divalent akylene group of 2–10 carbons.
2. 1-ethoxy-1-N-cyanoiminoethane.
3. 1,2-diethoxy-1-N-cyanoiminoethane.
4. 1-N-cyanoiminocyclohexane.
5. Bicyclo[2.2.1]heptane-2-N-cyanoimine.
6. 1-N-cyanoiminocyclopentane.
7. 2,2-dimethyl-3-N-cyanoiminobutane.
8. 2-N-cyanoiminopropane.

References Cited

Chemical Abstracts, vol. 53, column 16953(g) (1959).

BERNARD HELFIN, Primary Examiner

G. A. SCHWARTZ, Assistant Examiner

U.S. Cl. X.R.

260—551 C